United States Patent [19]
Bogner

[11] Patent Number: 5,388,484
[45] Date of Patent: Feb. 14, 1995

[54] METHOD OF MANUFACTURING DIAMOND-IMPREGNATED DRILLING CROWNS

[75] Inventor: Werner Bogner, Herrsching, Germany

[73] Assignee: Hilti Aktiengesellschaft, Fürstentum, Liechtenstein

[21] Appl. No.: 134,427

[22] Filed: Oct. 7, 1993

[30] Foreign Application Priority Data

Oct. 7, 1992 [DE] Germany .................... 4233770

[51] Int. Cl.⁶ ............................. B22F 5/08; B23P 15/28
[52] U.S. Cl. .................................... 76/108.2; 76/108.4;
76/DIG. 12; 125/30.01; 219/121.72; 219/121.85
[58] Field of Search ............ 76/108.2, 108.4, DIG. 12;
125/30.01, 39, 23.01; 175/435; 29/411, 414;
219/121.67, 121.68, 121.69, 121.72, 121.85

[56] References Cited
U.S. PATENT DOCUMENTS

| | | | |
|---|---|---|---|
| 1,572,349 | 2/1926 | Chamberlin | 76/108.2 X |
| 1,990,077 | 2/1935 | Kershaw | 76/108.2 X |
| 4,186,628 | 2/1980 | Bonnile | 76/108.2 |
| 4,989,578 | 2/1991 | Lebourg | 125/23.01 |
| 5,247,923 | 9/1993 | Lebourg | 76/108.2 X |

*Primary Examiner*—Douglas D. Watts
*Attorney, Agent, or Firm*—Anderson Kill Olick & Oshinsky

[57] ABSTRACT

A method of manufacturing drilling crowns for cylindrical diamond drilling tool bits affords a waste-free fabrication of the drilling crowns impregnated with diamond particles. In a first step an annular axially extending middle or intermediate zone impregnated with diamond particles is joined at each of its opposite end by sintering to a different annular metal end zone. In a second step the intermediate zone is laser cut to form two similar drilling crowns with circumferentially spaced teeth. The teeth form diamond segments providing economical fabrication and a high quality connection with the end zones.

6 Claims, 1 Drawing Sheet

METHOD OF MANUFACTURING DIAMOND-IMPREGNATED DRILLING CROWNS

BACKGROUND OF THE INVENTION

The present invention is directed to a method of manufacturing diamond-impregnated drilling crowns for cylindrical diamond drilling tool bits.

Diamond-impregnated drilling crowns are generally fabricated as single-part annular cutting drills up to approximately 42 mm in diameter and are used for wet drilling. Over approximately 42 mm in diameter they are formed as annular segments and are used for both wet and dry drilling.

Up to the present time the annular segments have been fabricated individually and, in an additional step, they are placed on a hollow cylindrical carrier to form the drilling crowns. Such a method required high accuracy, and it is complicated and expensive. It must be noted that the quality of diamond-impregnated drilling crowns is determined by the size and shape of the segments, by the cross-section of the connection between the segment and the hollow cylindrical carrier, as well as by the accuracy and strength of the connection. The manufacture of curved segments involve costly waste or scraps.

For instance, a drilling crown is disclosed in U.S. Pat. No. 4,208,154 where the segments were placed on a hollow cylindrical carrier using an intermediate layer. To create an adequate or satisfactory connection between the segments and the hollow cylindrical carrier, the segment or the intermediate layer and the hollow cylindrical carrier must have a specifically configured connection area affording a positive interconnection of the parts. A positive connection partially compensates for a possibly inadequate connection between the segment and the hollow cylindrical carrier. However, this is obtained only at considerable cost, since segments for intermediate layers as well as the hollow cylindrical carrier are subjected to shaping processes involving increased fabrication costs.

SUMMARY OF THE INVENTION

Therefore, the primary object of the present invention is to provide an economical and effective fabrication method for diamond-impregnated drilling crowns in annular segment shapes, and additionally the method affords a high quality standard particularly for the connection between the segments and the hollow cylindrical carrier.

In accordance with the present invention, an axially extending hollow cylindrical member is made up of two axially spaced metal end zones and an intermediate zone impregnated with diamond particles extending between the end zone. The zones are joined together in a sintering step and, subsequently, the cylindrical member is subdivided into two mirror image diamond-impregnated drilling crowns by laser cutting in the intermediate zone alternately in the axial and transversely of the axial direction.

The inventive method, after the laser cutting step, provides two diamond-impregnated drilling crowns in a mirror image arrangement with the separation into the two drilling crowns being effected in a single method step. As a result, the method is extremely economical, since no individual segments must be placed separately on the hollow cylindrical carrier. Further, the method is free of scrap or waste which is especially significant in view of the high quality and high cost of the inner diamond-impregnated intermediate zone formed of a matrix material and diamond particles.

The formation of the hollow cylindrical member with the two metal end zones and the diamond-impregnated intermediate zone affords the connection between the individual zones being formed in an optimum manner. This results in an extraordinary high quality of the connection between the individual zones. Moreover, the peripheral surfaces are optimally matched to one another and after the formation of the diamond-impregnated drilling crowns is completed, no further processing and machining is required.

To facilitate the connection of the diamond-impregnated drilling crowns, formed in accordance with the inventive method, with a cylindrical carrier member, the two metal end zones at the ends spaced from the intermediate zone are provided with a certain joint shape including an axially extending cylindrical surface and an annular surface disposed parallel to the free end face. Such an arrangement provides an axially extending region with a reduced wall thickness or a tapered contour which is afforded by the stepped outer surface, whereby the reduced wall thickness portion can be inserted into a specially shaped cylindrical carrier member. With the stepped outer surface at the free end there is no change in diameter between the drilling crown and the carrier member, so that there is no surface interference when the finished diamond-impregnated drilling crown is used.

The attachment of the drilling crown to the carrier member is effected in a known manner, such as by soldering. Accordingly, the drilling crown can be removed in the event its segments are worn and the carrier member can be reused by soldering a new drilling crown thereon. The cut produced by laser cutting extends in a zig-zag manner alternately axially and transversely of the axial direction through the diamond-impregnated intermediate zone resulting in interengaging teeth on the two drilling crowns formed. Thus, a crown-like profile with axially extending interengaging teeth is formed with the teeth spaced apart relative to one another in the circumferential direction on each drilling crown. Accordingly, each tooth provides a segment of the drilling crown.

An optimum utilization of the high grade diamond-impregnated intermediate zone is achieved, if in a preferred manner the crowns of the teeth of each boring crown extends along the joint between the intermediate zone and the metal end zone of the other drilling crown. This arrangement utilizes the entire diamond-impregnated intermediate zone for forming the height of the teeth and this feature is decisive for the useful life of the teeth acting as segments of the crown.

It is preferred, viewed from the aspect of manufacture as well as the aspect of actual use, if the teeth taper slightly inwardly toward the free end, that is, if their circumferential dimension decreases from the root to the crown of the teeth. Preferably, the teeth flanks are inclined at an angle in the range of 1° to 25° with respect to the long axis of the teeth.

For improving spot drilling behavior as well as improving the strength of the teeth, it is expedient to form rounded transitions at the crown as well as at the root or base of the teeth. Such rounded transitions have a preferred radius in the range of 1 to 2.5 mm. The formation of such rounded transition can be effected in a simple manner in carrying out the laser cutting step by appropriate guidance of the laser beam.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
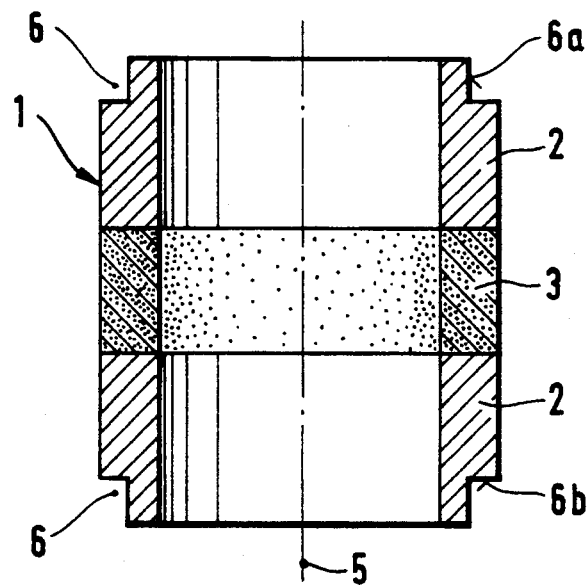
FIG. 1 is an axially extending sectional view of a hollow cylindrical member after the sintering step with the ends of the cylindrical member provided with a joining shape.

FIG. 1 shows an axially extending hollow cylindrical member 1 made up of two metal end zones 2 and an intermediate end zone 3 extending axially between the end zones. The intermediate end zone 3 contains interspersed diamond particles. The end zones 2 are secured to the intermediate end zone 3 in a sintering step. Further, FIG. 1 illustrates the configuration of the free ends of the hollow cylindrical member 1 machined with a joint shape 6 formed on a lathe. The joint shape 6 consists of an axially extending cylindrical surface 6a and an annular shoulder surface 6b extending parallel to the adjacent free end face of the cylindrical member. As a result, a step is provided in the outer circumferential surface of the two metal end zones 2 so that a connection to a carrier member can be provided without any change in the diameter of the carrier member and the end zones, this feature is not shown in the drawing.

Figure 2:
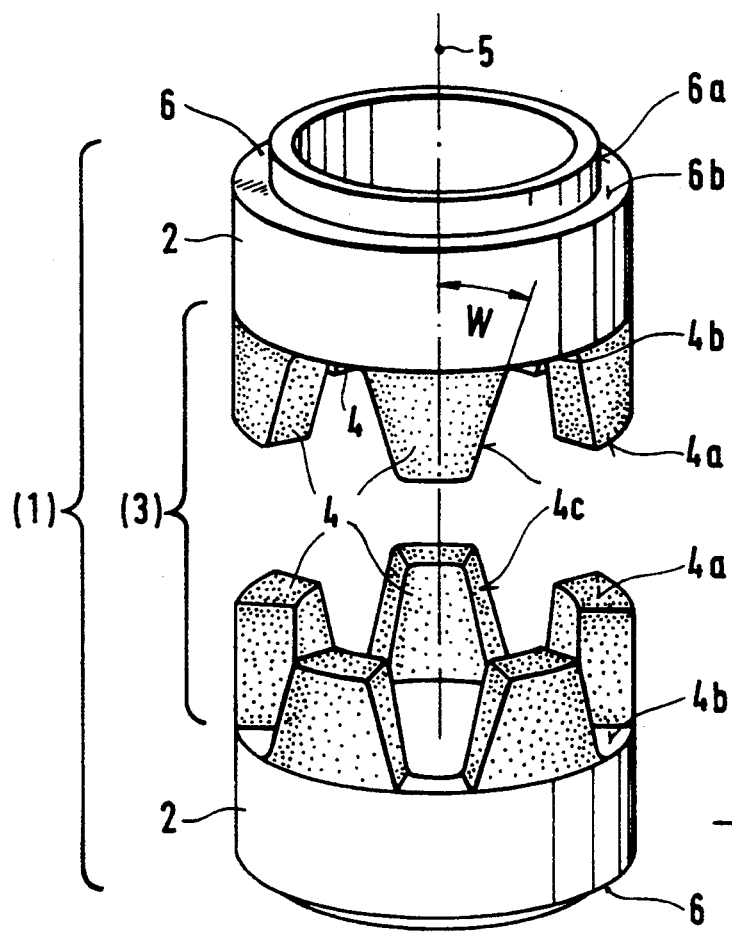
FIG. 2 is a perspective view of two mirror image drilling crowns formed from the hollow cylindrical member shown in FIG. 1.

In FIG. 2 the hollow cylindrical member 1 has been divided into two mirror image drilling crowns. This subdivision has been effected by a laser cutting step where the laser cuts alternately in the intermediate zone 3 in the axial direction and transversely of the axial direction. Due to the laser cutting step, the intermediate zone 3 impregnated with diamond particles is divided into interengaging teeth 4. As displayed clearly in FIG. 2, the height or axial dimension of the teeth extends for the entire axial dimension of the diamond-impregnated intermediate zone 3, whereby the base or root 4b of each tooth is located in the joining plane between the intermediate zone 3 and other end zone 2. The teeth 4 formed by the laser cutting step taper inwardly toward the crown 4a formed by the free end of the teeth, whereby the flanks 4c of the teeth are inclined at an angle in the range of 1° to 25° with respect to the long axis 5 of the teeth 4. In the laser cutting step, rounded transitions at the crown and at the root or base of the teeth can be provided.

While a specific embodiment of the invention has been shown and described in detail to illustrate the inventive principles, it will be understood that the invention may be embodied otherwise without departing from said principles.

I claim:

1. Method of manufacturing drilling crowns comprising drilling surfaces with impregnated diamond particles for use in cylindrical diamond drilling tool bits, comprising the steps of forming an axially extending hollow cylindrical member with two metal end zones joined together by an intermediate zone containing impregnated diamond particles extending between the end zones and securing the end zones to the intermediate zone in a sintering step, and subdividing the cylindrical member by laser cutting the intermediate zone for forming two mirror image drilling crowns and effecting the cutting step alternately in an approximately axial direction and a direction extending transversely of the axial direction.

2. Method, as set forth in claim 1, wherein forming each of the end zones at an end thereof spaced axially from the intermediate zone with a shaped surface consisting of an axially extending cylindrical surface and an annular surface extending transversely of the cylindrical surface with the cylindrical surface and the annular surface formed in an outer surface of the end zone.

3. Method, as set forth in claim 1 or 2, wherein in the laser cutting step the intermediate zone is divided into interengaging teeth.

4. Method, as set forth in claim 3, wherein each of the teeth of the drilling crown is connected to one of said end zones and has a crown spaced axially from the one of said end zones and a root located at the one of said end zones with the crown located in a plane defining a joining plane between the tooth and other said end zone.

5. Method, as set forth in claim 4, wherein said teeth taper inwardly from the root to the crown and each tooth has a long axis extending in the axial direction of the hollow cylindrical member and each tooth has flanks inclined at an angle in the range of 1° to 25° with respect to the long axis of the tooth.

6. Method, as set forth in claim 5, wherein each tooth has a rounded transition at the root thereof and at the crown thereof.

* * * * *